(12) United States Patent
Blancke et al.

(10) Patent No.: US 12,599,061 B2
(45) Date of Patent: Apr. 14, 2026

(54) CROP PICK-UP HEADER

(71) Applicant: CNH Industrial America LLC, New Holland, PA (US)

(72) Inventors: Jeffrey Blancke, Markegem (BE); Stijn Van Belleghem, Maldegem (BE); Jan-Pieter Vanden Broucke, Moorslede (BE)

(73) Assignee: CNH Industrial America LLC, New Holland, PA (US)

( * ) Notice: Subject to any disclaimer, the term of this patent is extended or adjusted under 35 U.S.C. 154(b) by 461 days.

(21) Appl. No.: 18/284,503

(22) PCT Filed: Mar. 30, 2022

(86) PCT No.: PCT/EP2022/058475
§ 371 (c)(1),
(2) Date: Sep. 27, 2023

(87) PCT Pub. No.: WO2022/207742
PCT Pub. Date: Oct. 6, 2022

(65) Prior Publication Data
US 2024/0365710 A1 Nov. 7, 2024

(30) Foreign Application Priority Data

Mar. 31, 2021 (EP) ..................................... 21166388

(51) Int. Cl.
*A01D 61/00* (2006.01)
*A01D 89/00* (2006.01)

(52) U.S. Cl.
CPC ......... *A01D 61/004* (2013.01); *A01D 89/002* (2013.01); *A01D 61/006* (2013.01)

(58) Field of Classification Search
CPC ...... A01D 41/06; A01D 41/127; A01D 41/14; A01D 41/16; A01D 61/002; A01D 61/004; A01D 61/006; A01D 89/002
See application file for complete search history.

(56) References Cited

U.S. PATENT DOCUMENTS 3,967,912 A 7/1976 Parker
4,910,951 A 3/1990 Reilly et al.
(Continued)

FOREIGN PATENT DOCUMENTS

CN 106576580 B 2/2020
DE 102018124012 A1 * 4/2020 ........... A01D 61/006
(Continued)

OTHER PUBLICATIONS

Extended European Search Report for European Application No. 21166388.5, dated Oct. 29, 2021 (Oct. 29, 2021)—4 pages.
(Continued)

*Primary Examiner* — Jacob S. Scott
*Assistant Examiner* — Temesgen M. Maru
(74) *Attorney, Agent, or Firm* — CM Law PLLC; Stephen J. Weed

(57) ABSTRACT

A crop pick-up header (2) according to the invention comprises a frame (10) and a rotatable reel (13) configured to collect crops from the ground, as well as a rotatable auger (20) provided with two oppositely wound helicoidal flights (26). The auger is rotatable about its central axis with respect to a pair of support arms (21) which are themselves pivotable relative to the frame, so that the pivoting movement of the arms results in lowering or raising the auger. The height position of the auger (20) is a function of the crop throughput and of the auger's rotational speed. The header of the invention is equipped with at least one sensor (30) configured to measure the height position of the auger or a
(Continued)

parameter representative thereof. The header comprises or is coupled to a control unit (31) configured to control the auger's rotational speed as a function of the detected height position, determined through the sensor (30). In particular, the auger speed is lowered when the auger drops below a predefined height, so that lower throughput is compensated by a lower auger speed, thereby ensuring efficient chopping in a harvester to which the 20 header is coupled, even when the crop yield drops below a given level.

17 Claims, 2 Drawing Sheets

(56) References Cited

U.S. PATENT DOCUMENTS

| | | | |
|---|---|---|---|
| 6,024,178 A | 2/2000 | Pickett et al. | |
| 6,315,658 B1 * | 11/2001 | Weber ................ | G05B 13/0275 56/10.2 G |
| 11,006,577 B2 * | 5/2021 | Jelenkovic ................ | G06T 7/62 |
| 11,375,665 B2 * | 7/2022 | Fries .................... | A01D 43/086 |
| 2005/0279073 A1 | 12/2005 | Clauss et al. | |

FOREIGN PATENT DOCUMENTS

| | | | |
|---|---|---|---|
| EP | 0471961 A1 | 2/1992 | |
| EP | 1738634 A1 * | 1/2007 | ........... A01D 61/008 |
| EP | 2143316 A1 * | 1/2010 | ........... A01D 41/127 |
| EP | 2735223 A1 * | 5/2014 | ............. A01F 29/14 |
| EP | 3718392 A1 | 10/2020 | |
| GB | 1419101 A | 12/1975 | |
| JP | 2011004629 A | 1/2011 | |
| JP | 2020000123 A | 1/2020 | |

OTHER PUBLICATIONS

International Search Report and Written Opinion for International Application No. PCT/EP2022/058475, dated Jul. 26, 2022 (Jul. 26, 2022)—11 pages.
CLAAS of America: "CLAAS Jaguar Pick Up—Easy to Operate" [Video]. YouTube, uploaded by CLAAS, Jun. 5, 2023. https://youtu.be/WrNiTvgNbDc?si=7kLdDDnPkICABBXi (5:11).

* cited by examiner

CROP PICK-UP HEADER

FIELD OF THE INVENTION

The present invention is related to a crop pick-up header that can be mounted on an agricultural implement, such as a self-propelled forage harvester.

STATE OF THE ART

Pick-up headers are used for example for collecting grass that has been previously cut and left to dry on a field in the form of elongate swaths. A forage harvester is fitted with the pick-up header at its front, and driven along the swaths. The header picks up and collects the grass, and delivers it to the inlet of the forage harvester, where it is taken in by a set of feed rolls, followed by a rotating chopper drum, which chops up the grass stalks into smaller portions. The chopper drum rotates at a constant rotational speed, whereas the rotational speed of the feed rolls can be adapted as a function of the desired length of cut (LOC), i.e. the length of the chopped portions, which may vary from 4-5 mm to about 45 mm.

A pick-up header generally comprises an intake reel that picks up the crops and delivers them to a rotating auger equipped with two oppositely oriented auger flights. The crops are thereby transported to a central area of the header from where they are transferred to the feed rolls of the harvester. The auger as a whole is mounted so as to be able to pivot about a hinge axis and rests on the incoming crops, so that it may be pivoted upward and downward as a function of the amount of crop that is being picked up by the reel. In currently applied pick-up headers, the rotational speed of the auger is linked either mechanically or by an electronic control means, to the speed of the feed rolls. In other words, when the feed rolls rotate faster in order to obtain a larger LOC, the auger also rotates faster.

This way of controlling the auger speed works well when the crop yield, for example the amount of grass per unit length of a swath, is higher than a given minimum. This ensures that the pockets of the auger, i.e. the areas between the auger flights, the auger tube, and the floor of the header, are adequately filled, so that a steady supply of crops to the feed rolls of the harvester can be realised. However, when the yield is low, the pockets of the auger are no longer filled with crops, resulting in an irregular supply of crops to the feed rolls. The irregular supply leads to inefficient chopping and unwanted vibrations of the harvester. The problem is most acute when the required LOC is high, which corresponds to high feed roll speed.

One solution could be to drive faster when the crop yield is lower, but this is not an acceptable solution in many circumstances, for example from a safety viewpoint. Also, the yield itself may be irregular and it would be difficult for the driver to assess and react sufficiently quickly to changes in the crop yield.

SUMMARY OF THE INVENTION

The invention is related to a crop pick-up header, to a self-propelled harvester equipped with such a header, and to a method for controlling the auger speed as described in the appended claims. A crop pick-up header according to the invention comprises a number of components which are known from prior art headers, such as a frame and a rotatable reel configured to collect crops from the ground, as well as a rotatable auger provided with two oppositely wound helicoidal flights. The auger is rotatable about its central axis with respect to a pair of support arms which are themselves pivotable relative to the frame, so that the pivoting movement of the arms results in lowering or raising the auger with respect to the floor of the header. The height position of the auger is a function of the crop throughput and the auger's rotational speed. The header of the invention is equipped with at least one sensor configured to measure the height position of the auger or a parameter representative thereof, such as the angular position of the support arms. The header further comprises a speed drive for driving the rotation of the auger and the header comprises or is coupled to a control unit configured to control the auger's speed as a function of the detected height position, determined through the sensor. In particular, the auger speed is lowered when the auger drops below a predefined height, so that lower throughput is compensated by a lower auger speed, thereby ensuring efficient chopping even when the crop yield drops below a given level.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

Figure 1:
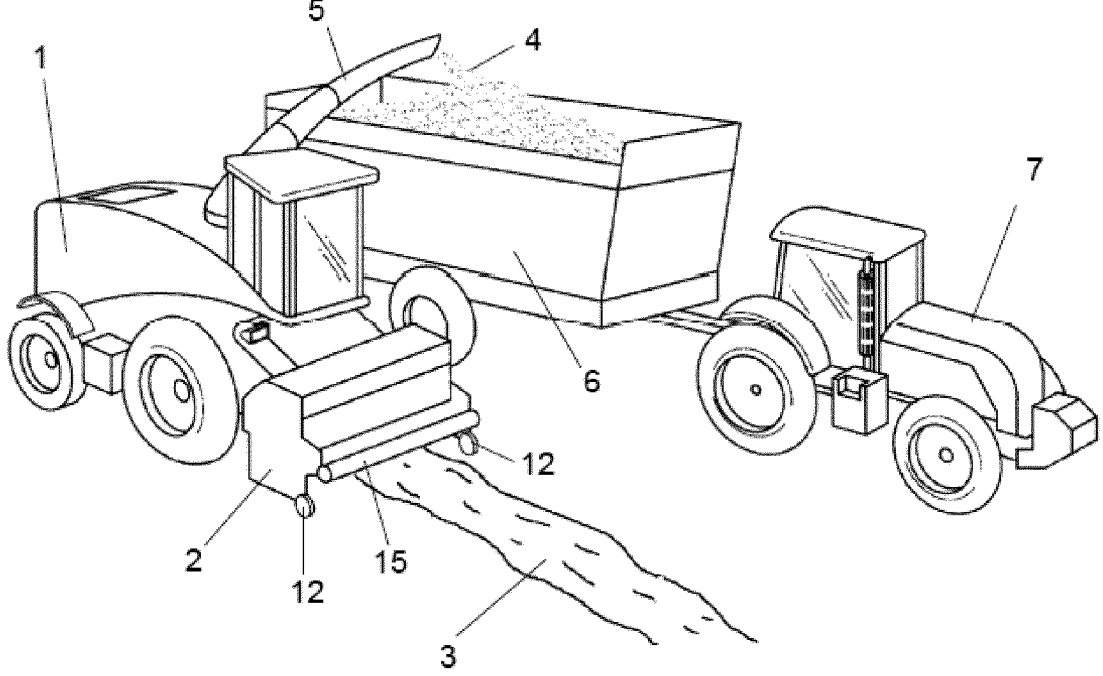
FIG. 1 illustrates a typical harvesting situation wherein a grass pick-up header is attached to a forage harvester.

FIG. 1 illustrates a self-propelled forage harvester 1 that is collecting and processing grass from a field through a pick-up header 2 mounted at the front of the harvester and not shown in much detail in the drawing, apart from the front support wheels 12 of the header and a windguard roll 15 (these elements will be described in more detail later). Grass swathes 3 are lying along parallel trajectories on the field, having been cut previously, and the harvester driver follows these trajectories to collect and process the grass into chopped stems or particles. A stream 4 of processed grass is ejected from the spout 5 of the harvester and discharged into a trailer 6 towed by a tractor 7 that is driven alongside the harvester 1.

Figure 2A:
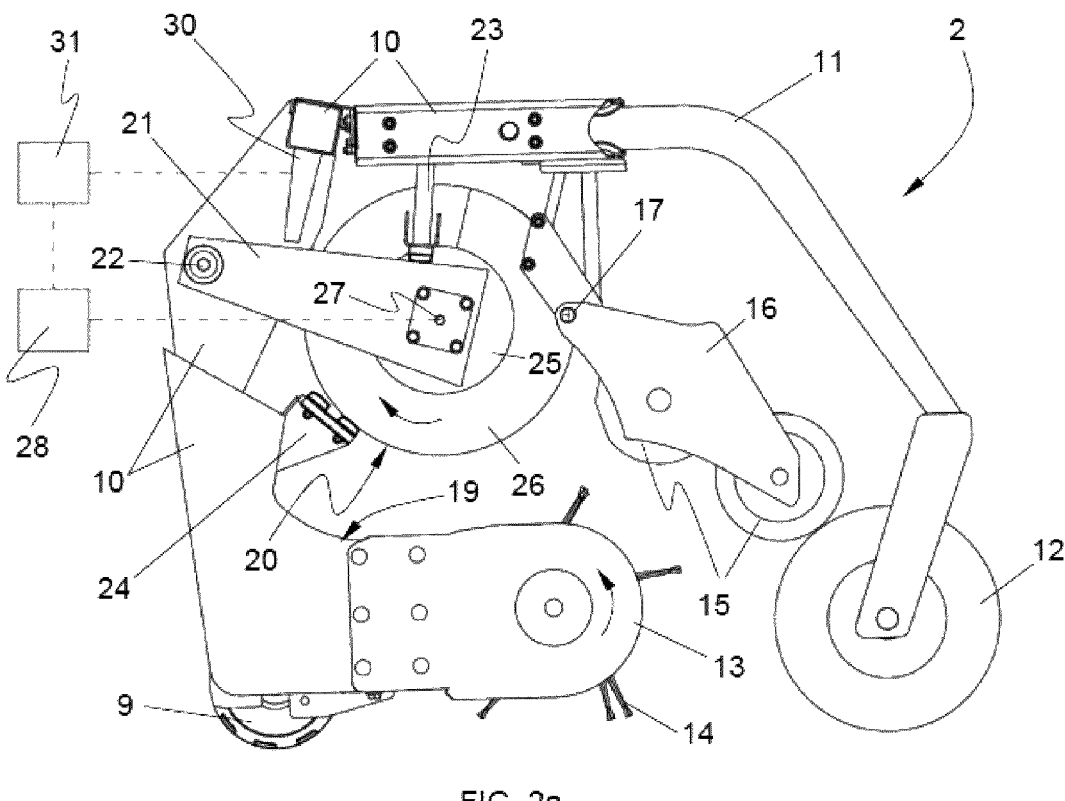
FIGS. 2a and 2b show side views of a pick-up header according to an embodiment of the invention, wherein the auger is respectively in a high and in a low position.
Figure 2B:
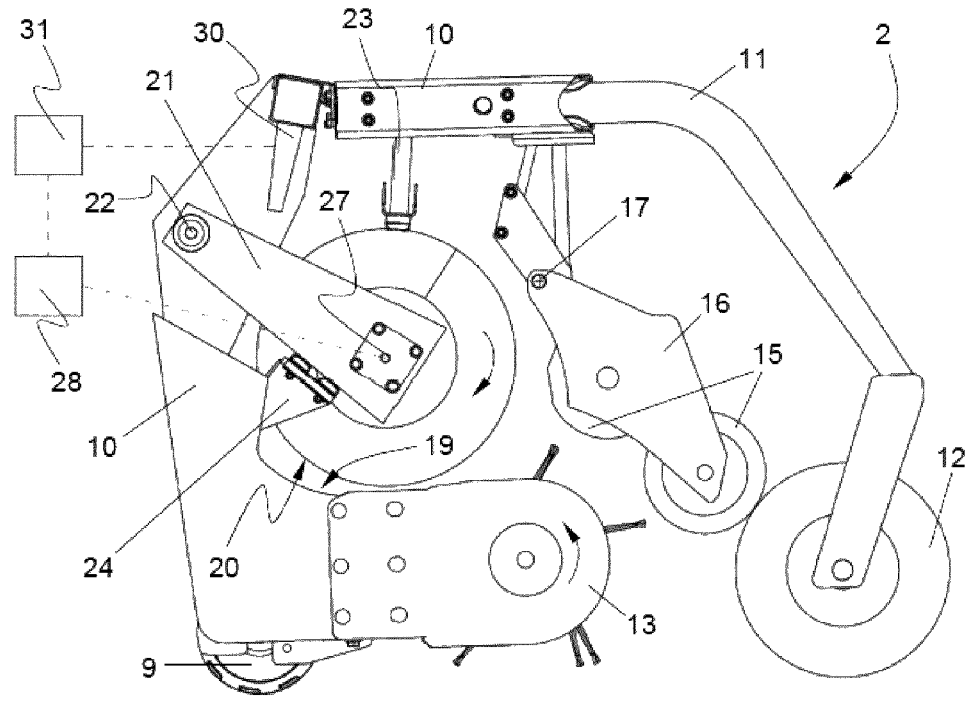

A pickup header 2, e.g. a grass pickup unit, in accordance with an embodiment of the invention is shown in a little more detail in a side view in FIGS. 2a and 2b. The drawings are still simplified with respect to an actual header, as they intend to show only the main components in order to explain the present invention. The header 2 comprises a frame 10. The frame 10 is equipped with a coupling structure (not shown) that is to be attached to the harvester 1, and that includes a coupling for a drive axle as well as hydraulic and/or electrical connections. This type of coupling structure is well-known in the art and therefore not shown in the drawings.

Two lateral arms 11 are attached to the header frame 10 and coupled respectively at their distal ends to two front support wheels 12. A reel 13, also called pickup, extends in the direction perpendicular to the plane of the drawing. The reel 13 is rotatable about its central axis, relative to the frame 10, in the rotation direction indicated by the arrow. The reel is provided with tines 14 which gather the crops and move them upwards in the direction of a floor portion 19 of the header frame 10. At the back, the frame 10 comprises a set of wheels 9 which do not touch the ground when the header is attached to a harvester and in the process of collecting crops. In operation, the header is supported only by the front wheels 12. The back wheels 9 serve as a protection for the tines 14 when sudden depressions appear in the terrain.

Windguard rolls 15 are rotatably coupled to a windguard frame 16 that is pivotably coupled to the header frame 10, at pivot axis 17. The windguard frame 16 can be actively rotated about pivot axis 17 by one or more actuators (not shown). As well-known in the art, the function of the windguard rolls 15 is to maintain the crops which have been picked up by the reel 13, while the crops move on a path towards the auger 20. The windguard rolls 15 can rotate passively, i.e. under the influence of crops passing between the reel 13 and the windguard rolls 15.

The auger 20 is mounted above the reel 13 and above the floor portion 19, between a pair of support arms 21, which are pivotable relative to the header frame 10 about a common pivot axis 22. The range of the pivoting motion of the arms 21 is limited by stops 23 and 24 fixed to the header frame 10. FIG. 2a shows the auger 20 in the uppermost position, wherein the auger support arms 21 are lying against the upper stops 23, while FIG. 2b shows the auger 20 in the lowermost position, wherein the arms 21 are lying against the lower stops 24. As well-known in the art, the auger 20 comprises a central tube 25 onto which two helicoidal flights 26 are fixed, one on either side of the central vertical plane of the auger, as seen in the direction perpendicular to the drawings. The flights 26 are oppositely oriented, so that crops which are transferred by the reel 13 to the auger 20 are transported towards the middle area of the header by the auger's rotation in the indicated direction, about its central axis 27. From the middle area, the crops are subsequently taken in by the feed rolls of the harvester.

For a given rotational speed of the auger 20, the angular position of the arms 21 and thereby the height position of the auger 20 during harvesting is determined by the crop throughput from the reel 13 to the auger 20. This throughput determines the thickness of a mat of crops that is being moved from the reel 13 to the auger 20, along a path controlled by the reel 13 and the windguard rolls 15. The rotating auger 20 rests on the moving mat of crops and therefore moves to a higher or lower position as a function of the thickness of the mat, i.e. as a function of the crop throughput. The auger 20 is pushed onto the mat of crops by its own weight, possibly increased by a spring force exerted by a spring (not shown in the drawings and well-known in existing pick-up headers) mounted between the support arms 21 and the frame 10. For a given drive speed of the harvester 1 and a given rotational speed of the reel 13 and of the auger 20, the crop throughput depends on the crop yield, i.e. the amount of crops that are to be collected. When the auger 20 is rotated at a constant speed, as it is the case in the presently known headers, the auger is at a lower position when the crop yield is low compared to a high-yield situation. The auger's height position can therefore be said to be a function of the crop throughput and of the auger speed. As stated, in currently known systems, the auger speed is maintained constant, so that it is only the crop throughput that determines the auger's height position.

The auger 20 is rotated about its own central rotation axis 27 and relative to the support arms 21, by a speed drive 28, represented in a merely schematic way in the drawings. This may be a hydraulic motor or an electric motor as known as such in the art. The speed drive 28 is configured so that it is possible to drive the rotational speed of the auger 20 independently from other rotating components of the header 2 or of the agricultural implement to which the header is coupled. This means that when the header 2 is coupled to a forage harvester 1, the auger speed is not mechanically coupled to the speed of the harvester's feed rolls. The fact that the auger is not mechanically coupled to the feed rolls or other rotating elements is not novel in itself, however the present invention adds to this aspect a novel way of controlling the auger speed as such.

Characteristically, a header according to the invention comprises at least one sensor that is used to determine the position of at least one of the support arms 21 about the rotation axis 22, said position being an indicator of the height position of the auger 20. The sensor may be an angle sensor that is mounted on the rotation axle of one of the arms 21, for example a potentiometer angle sensor, as well-known in the art and which indicates the angular position of the arms 21 about axis 22. An alternative could be an optical position sensor attached to the frame 10 of the header 2 and arranged to measure the distance of one of the support arms 21 to the sensor. What counts is that the sensor produces a signal that enables to determine the height position of the auger 20 relative to the floor 19 of the header. The latter type of sensor, i.e. an optical sensor 30 mounted on the frame 10, and configured to measure the distance to one of the arms 21, is illustrated in FIGS. 2a and 2b.

According to the invention, the rotational speed of the auger 20 about its rotation axis 27 is controlled as a function of the auger height position, as determined by the optical sensor 30 or its equivalent. The output of the sensor 30 is sent to a control unit 31, which sends out a control signal to the speed drive 28. In the image shown in FIG. 2a, the rotating auger 20 is in the top position, for example as a consequence of a high yield of crops on the field where the header is collecting crops.

When the yield drops, the auger 20 descends to a lower position, possibly falling to the lowest position illustrated in FIG. 2b. This is detected by the sensor 30. The signal produced by the sensor is sent to the control unit 31, which sends out a control signal configured to reduce the speed by which the speed drive 28 actively rotates the auger 20. The control unit 31 may be part of the header as such, but it may also be a control unit incorporated in the agricultural implement, for example the harvester 1, to which the header is coupled. It may for example be an existing control unit of the harvester that is additionally programmed to regulate the auger speed in accordance with the present invention.

As stated in the section on prior art, when the auger falls below a given height because of low yield, and if the auger continues to rotate at a constant speed, as in presently known headers, the pockets of the auger are no longer fully filled, leading to inefficient chopping. However when the auger speed is reduced, proper filling of the pockets is resumed. The reduction in auger speed at lower yields therefore enables more complete filling of the pockets of the auger, rendering the chopping process more efficient.

Different control algorithms by which the auger's rotational speed is regulated as a function of the sensor output may be applied within the scope of the invention. What counts is that the speed is reduced when the auger height drops below a predefined value which may be the uppermost height position shown in FIG. 2a or any value below it (but above the lowermost position of FIG. 2b). According to one embodiment, the header is mounted on a forage harvester, and the auger speed is regulated as a function of the feed roll speed, for example equal to the feed roll speed or equal to a fixed ratio of the feed roll speed, as long as the auger is above a given reference position, for example halfway between the extremes shown in FIGS. 2a and 2b. This reference position corresponds to the 'predefined value' referred to in the independent claims. When the auger drops below this reference position, as a consequence of a reducing yield, the auger speed is no longer a function of the feed roll speed, but it is reduced below the speed applied above the reference position. This drop in the auger speed itself may be any suitable function of the sensor output, i.e. of the measured auger height position, for example a sudden drop to a predefined lower speed, or a gradual speed reduction to said predefined speed, or a reduction that follows the change of the height position of the auger. According to a first version of this embodiment, the auger remains below the reference position as long as the yield is lower than a given limit, by keeping the auger speed lower than the feed roll speed or the fixed ratio thereof. When the yield increases again, the auger is raised above the reference position by the increasing crop throughput, and the fixed ratio of the feed roll speed may again be applied.

According to a second and more preferred version, the auger speed is reduced to such a degree that the auger is again raised, preferably to the reference position or above said reference position. As stated above, the reduction of the auger speed causes the pockets of the auger again to be properly filled, despite the lower crop throughput. When the auger speed is reduced even further, the auger is again raised by the increasingly thick mat of crops coming from the reel, and building up upstream of the auger because of the latter's slower speed and the complete filling of the pockets. According to this embodiment therefore, as soon as the auger speed drops below the reference position, the height of the auger, as determined through the sensor 30, becomes a controlled variable and the auger speed is lowered to the extent that the auger's height increases, preferably until the height reaches again the reference position or a position above said reference position, at which point the auger speed is again maintained equal to or at a constant ratio of the feed roll speed. Above this reference height therefore, the auger speed is constant and the height position of the auger is variable as a function of the crop throughput, i.e. as a function of the yield. However, below the reference height, the auger speed is lowered until the auger reaches again the reference position. Below the reference height therefore, the height control is self-regulating, using the auger height as the controlled variable and the auger speed as the controlling variable. Any known control strategy for a self-regulating system may be applied, for example PI (proportional-integral), PID (proportional-integral-derivative) or other.

According to another embodiment, the self-regulating control method is applied throughout the full height range as defined by the stops 23 and 24, i.e. not only below a given reference height of the auger 20. In this case, the control unit 31 may be configured to maintain the auger at a predefined height or within a predefined height range. In the case of a predefined height range, the 'reference position' referred to above is now a 'first reference position' defined as the lower limit of this range and the upper limit defines a second reference position higher than the first. The auger speed is now controlled in the two directions: when the auger drops below the target range, i.e. below the first reference value, the speed is decreased until the auger rises again to a level within the predefined range. When the auger rises above the range, i.e. above the second reference value, for example when the yield increases to a given degree, the speed is increased until the auger comes down again to a value within the range. The first and second reference positions may be equal to each other in which case the auger height is controlled to remain essentially constant and equal to the single reference value.

In any of the above-described versions of the actual control algorithm applied to control the auger speed and height, a minimum auger speed is preferably defined below which the speed cannot go regardless of the measured height position. In the embodiment involving continuous control of the height position within the full height range, a minimum and a maximum allowable auger speed may be defined. These limits may be programmed in the control unit 31.

Also in combination with any of the above-described control strategies, the control unit 31 may be configured to perform these strategies only when crops are being collected by the header 2. This avoids unwanted changes in the auger speed for example when the auger 20 is actively raised or lowered by actuators provided for this purpose. Such actuators are not shown in the drawings, but they are generally present, for example for positioning the auger at a given start position, or for raising the auger for the removal of foreign objects.

In order to determine whether or not crops are actually being collected by the header 2, a signal may be used from any of a number of detectors which are known as such, for example a yield sensor mounted in the vicinity of the feed rolls, a humidity sensor mounted inside the spout of the harvester, or a crop velocity sensor, mounted on the outside of the spout of the harvester. The control unit 31 may be configured to receive one or more of these signals and determine on the basis thereof whether or not crops are actually being collected by the header 2. The auger speed control in accordance with the invention is then applied only on condition that presence of crops in the header has been determined in this way.

The header 2 may comprise more than one sensor, for example two optical sensors directed at each of the two support arms 21. The height of the auger 20 may then be determined by averaging the height measured by both sensors.

The invention is equally related to a self-propelled forage harvester equipped with a crop pick-up header according to the invention. As stated above, the control unit of the harvester may be programmed to enable the auger speed control as described.

A header according to the invention may however be mounted on other suitable agricultural implements, other than a forage harvester.

The invention is equally related to a method of controlling the rotational speed of the auger 20 of a crop pick-up header 2 according to the invention. The term 'controlling' is to be understood as 'actively changing' the speed as a function of the height measured by the sensor 30, not as 'controlling the speed by changing another variable'. As explained, the speed may be changed in order to control another variable, namely the auger height position. Reference has been made above to the method by referring to suitable algorithms implemented in the control unit 31 and configured to control the auger speed. Expressed in a more formalistic way, the method of the invention comprises the following steps performed when the header is in operation, i.e. while it is collecting crops:

measuring the height position of the auger 20 or a parameter representative thereof, such as the angular position of one of the support arms 21, or an average of the angular positions of both arms,

controlling the rotational speed of the auger 20 on the basis of a control algorithm wherein the auger speed is reduced when the auger's height position drops below a predefined value.

As described above, various alternatives are possible in terms of how the speed is controlled when the auger is positioned above the predefined value. These alternatives are not limited to the case wherein the header is coupled to a forage harvester and wherein the auger speed is equal to or equal to a constant ratio of the feed rolls speed when the auger is above the reference position. In a more general sense, it can be said that according to some embodiments, the auger speed is not a function of the measured height position when the auger is above the reference position and that below the reference position, the auger speed is lowered, preferably to the extent that the auger's height position increases again. According to other embodiments, the auger speed may be controlled continuously as a function of the measured height position, i.e. not only lowering the speed when the height drops below a first reference position, but also increasing the speed when the height rises above a second reference position equal to or higher than the first reference position, in order to maintain the auger height at a predefined position or within a given range.

The invention claimed is:

1. A crop pick-up header for use with an agricultural implement, the crop pick-up header comprising:
   a frame;
   a rotatable reel;
   an auger that is rotatable about a central rotation axis and that is configured to receive crops which have been picked up by the rotatable reel, the auger comprising flights for moving the received crops towards a central area of the crop pick-up header, wherein the auger is mounted between two support arms which are pivotable relative to the frame, about a common axis that is parallel to the central rotation axis of the auger such that a height position of the auger with respect to a floor portion of the frame is variable as a function of a rotational speed of the auger and of throughput of the received crops that are being transferred from the reel to the auger;
   at least one sensor configured to determine the height position of the auger relative to the floor portion, or a parameter representative thereof; and
   a speed drive configured to drive the rotational speed of the auger independently from other rotating components of the crop pick-up header or of the agricultural implement;
   wherein a control unit in the crop pick-up header or the agricultural implement is configured to control the rotational speed of the auger as a function of the height position as determined using the at least one sensor such that the rotational speed is reduced when the height position of the auger drops below a predefined value.

2. The crop pick-up header according to claim 1, further comprising the control unit.

3. The crop pick-up header according to claim 1, wherein the sensor is an angle sensor mounted on the common rotation axis of the two support arms.

4. The crop pick-up header according to claim 1, wherein the sensor is an optical sensor mounted on the frame and configured to measure distance between one of the support arms and the sensor itself.

5. The crop pick-up header according to claim 1, wherein an angular position of the support arms is limited by an upper stop and a lower stop.

6. An agricultural implement equipped with the crop pick-up header according to claim 1.

7. The agricultural implement according to claim 6, wherein the agricultural implement comprises the control unit.

8. The agricultural implement according to claim 6, wherein the agricultural implement is a self-propelled forage harvester comprising a set of feed rolls, with the crop pick-up header mounted at a front of the self-propelled forage harvester, so as to deliver the received crops to the feed rolls of the self-propelled forage harvester.

9. The agricultural implement according to claim 6, further comprising:
   a detector configured to determine whether or not crops are being collected by the crop pick-up header, and wherein the control unit is configured to control the rotational speed of the auger as a function of the height position as determined through the at least one sensor, only when it is determined through the detector that crops are being collected by the crop pick-up header.

10. A method for controlling the rotational speed of the auger of the crop pick-up header according to claim 1, the method comprising the steps of:
   measuring the height position of the auger or a parameter representative thereof using the at least one sensor; and
   controlling the rotational speed of the auger with a control algorithm implemented in the control unit, wherein the rotational speed is reduced when the height position drops below a predefined height value.

11. The method according to claim 10, wherein the auger rotational speed is not a function of the height position when the auger is positioned at or above the predefined height value.

12. The method according to claim 11, wherein the rotational speed reduction of the auger is configured to cause the height position to increase.

13. The method according to claim 11, wherein the rotational speed reduction of the auger is configured to cause the height position to increase to a height equal to or above the predefined height value.

14. The method according to claim 11, wherein the auger rotational speed is constant when the auger is positioned at or above the predefined height value.

15. The method according to claim 11, wherein the crop pick-up header is coupled to a self-propelled forage harvester comprising a set of feed rolls, with the crop pick-up header mounted at a front of the self-propelled forage harvester, so as to deliver crops to the feed rolls of the self-propelled forage harvester, and wherein the rotational speed of the auger is a function of the speed of the feed rolls when the auger position is above the predefined height value.

16. The method according to claim 15, wherein the auger rotational speed is equal to the feed roll speed or to a constant ratio of the feed roll speed, when the auger position is above the predefined height value.

17. The method according to claim 10, wherein the auger rotational speed is increased when the height position rises above another predefined height value, higher than or equal to the predefined height value, and wherein the increase of the auger rotational speed is configured to cause the height position of the auger to decrease until the height position is between the predefined height value and the other predefined height value, or equal to the predefined height values if the predefined height value and the other predefined height value are equal to each other.

* * * * *